Figure 1:
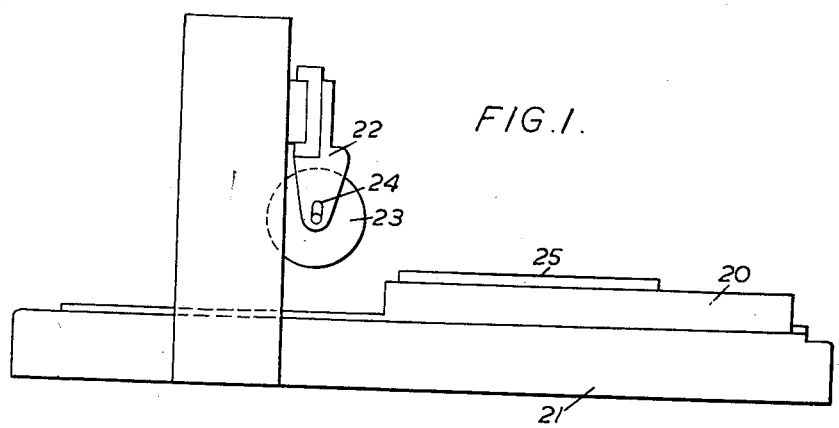

May 25, 1954   F. B. COLLINSON   2,679,291
IMPROVED SOLE-CUTTING MACHINE
Filed Oct. 11, 1949   4 Sheets-Sheet 1

Inventor
Frederick B. Collinson
By,
Attorney

May 25, 1954 F. B. COLLINSON 2,679,291
IMPROVED SOLE-CUTTING MACHINE
Filed Oct. 11, 1949 4 Sheets-Sheet 2

Inventor
Frederick B. Collinson
By
Attorney

May 25, 1954     F. B. COLLINSON     2,679,291
IMPROVED SOLE-CUTTING MACHINE
Filed Oct. 11, 1949                     4 Sheets-Sheet 3
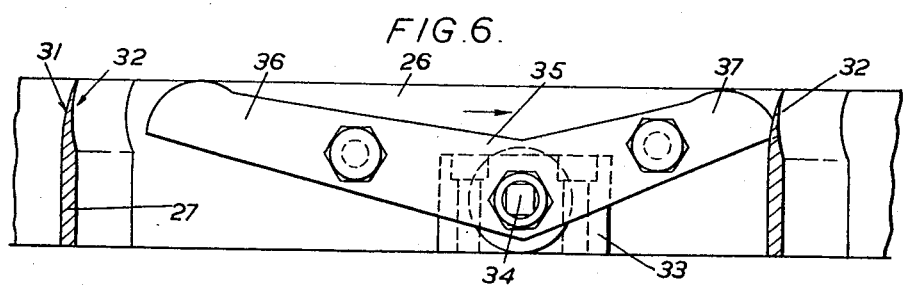
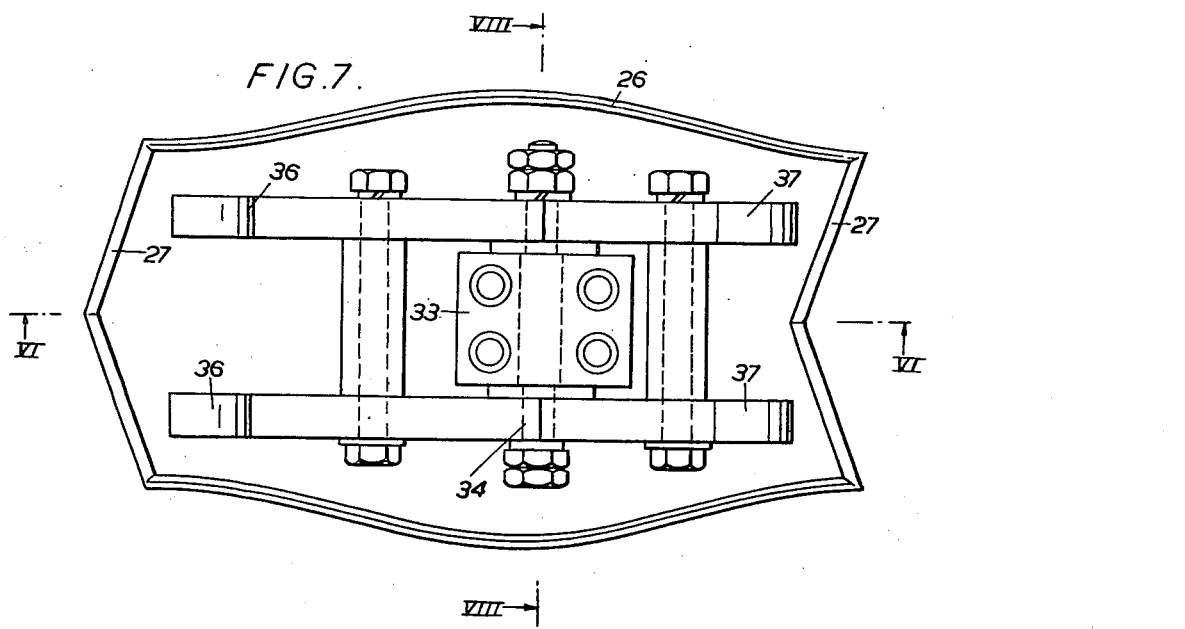
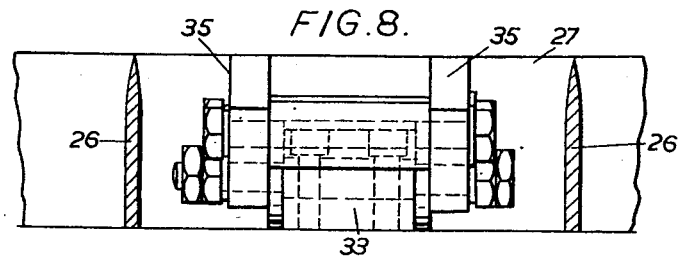
Inventor
Frederick B. Collinson
By
Attorney May 25, 1954    F. B. COLLINSON    2,679,291
IMPROVED SOLE-CUTTING MACHINE
Filed Oct. 11, 1949    4 Sheets-Sheet 4
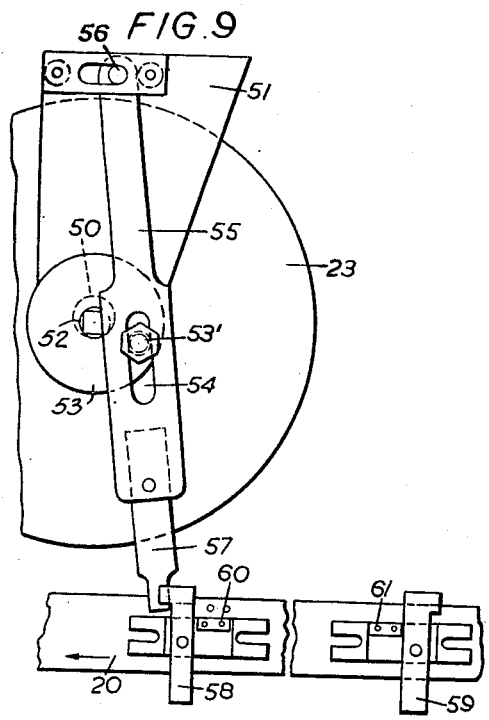
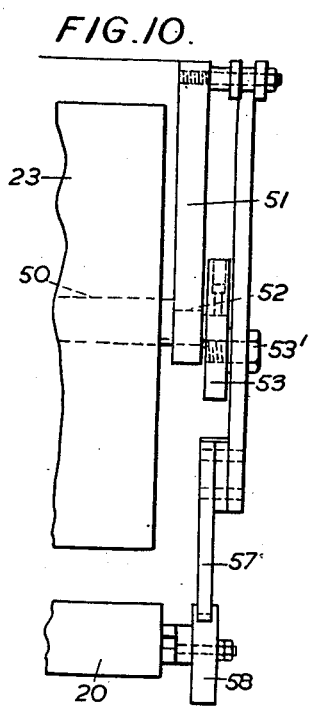
Frederick B. Collinson, Inventor
By
Attorney Patented May 25, 1954

2,679,291

UNITED STATES PATENT OFFICE 2,679,291

IMPROVED SOLE-CUTTING MACHINE

Frederick Baker Collinson, Litherland, Liverpool, England, assignor to Collinson's Patents Limited, Liverpool, England Application October 11, 1949, Serial No. 120,732

Claims priority, application Great Britain October 16, 1948

5 Claims. (Cl. 164—19)

This invention is for improvements in or relating to machines for cutting "shapes" from sheet material. The invention is more particularly concerned with a machine for use in the production of what are known as cut soles, that is, soles for boots and shoes which are cut, at least approximately, to shape prior to being supplied to a boot repairer or manufacturer.

One method of cutting soles in use at the present time consists in placing a bend of leather, with a knife having the shape of the sole to be cut superimposed on it, in a press and operating the press so that the sole is stamped out of the bend. The knife, or another knife depending on the size of the sole to be cut, is moved from place to place on the bend for each cutting operation, i. e. the soles are cut out one at a time from the bend. This is a time-taking and laborious process but equally, or more objectionable, is the fact that the operator has to position the knife with great accuracy for each sole to be cut and on the accuracy of such positioning depends the amount of leather wasted between adjoining soles. A skilled operator can reduce this waste to a minimum but having regard to the shape of soles cut heretofore some wastage of leather between adjoining soles has been unavoidable, so as to ensure getting a full shaped sole.

In the specification of my British Patent No. 579,343 there is described a method and machine designed to eliminate, at least to a substantial extent, the skill necessary in the cutting of soles and at the same time eliminate or reduce the wastage of leather between adjoining soles. The present invention has the same object and in some respects is more particularly concerned with improvements in or modifications of the machine described in my above mentioned patent specification No. 579,343.

Briefly the machine described in patent specification No. 579,343 comprises a cutting member having knives arranged to form a multiple pattern of the shapes to be cut, a pressing member and means for effecting relative traversing movement between the cutting member and the pressing member, one over the other, so as progressively to impress a sheet of material, fed or located between said members, onto the pattern of knives and cut the shapes from the material. In the preferred embodiments of the machine the knives are arranged to form an interfitting (i. e. jig-saw) multiple pattern of the shapes (e. g. soles) to be cut. By making a jig-saw knife pattern comprising closed figures there is no waste between neighbouring soles. It is very convenient to adapt a planing machine for carrying the invention, described in the above mentioned patent specification, into effect, the cutting member or pattern of knives being mounted on the movable platen or table of the machine and the pressing member, which is in the form of a roller, being mounted on the tool carrier of the machine. The bend of leather or other sheet material to be cut is fed between the pattern of knives and the roller by the movement of the platen or table and the roller impresses the material onto the knives.

I have found that when cutting shapes from certain materials, and particularly when cutting soles from a bend of leather, that the cut shapes do not always have the required dimensions particularly as regard their dimension in the direction in which the sheet material is fed into the machine. For example, cut soles tend to have a length less than that of the "knife-pattern" by which they are cut. Furthermore the forward (i. e. toe) and rear edges of the soles tend to be inclined at an angle to the plane of the sole instead of being truly vertical as is desirable. I believe that both these defects may be due to relative movement between the sheet or bend of leather and the pattern of knives during the actual cutting operation, i. e. during movement of the bend through the machine. In addition or alternatively these defects may be due to stretching of the bend during the cutting operation.

One object of the present invention is to overcome, at least to a substantial extent, the above mentioned defects.

Accordingly the present invention provides a machine of the character above described and having its parts arranged or provided with means to prevent relative movement between the sheet or bent and the cutting member, and/or to prevent or release stretching or distortion of the sheet or bend, during the cutting operation.

A preferred manner of carrying the present invention into effect is to make the rear faces of the transverse knives of the cutting member, at and adjacent their cutting edges, of bevelled or wood-chisel-like form and the foremost faces of said knives, at and adjacent their cutting edges, of concave or "hollow ground" form. An alternative or additional arrangement for the same purpose is to tilt the knives so that their cutting edges point in the direction of movement of the sheet or bend through the machine. It will be understood that the force provided by the roller to press the sheet or bend onto the knives may, due to the cross-section of the knives have a substantial component acting in the plane of the sheet or bend and tending to slide it relatively to the knives. The particular formation and arrangement of the transverse knives just described reduces this component to a very material extent. The term "rear" where used above in relation to the knives is intended to mean the rear with respect to the movement of the machine during the cutting operation.

From another point of view the above defects may be due to the angular movement of the forward (e. g. toe) end of each shape or sole as it is forced onto the transverse knife by the roller, i. e. the angular movement of the partially cut soles about the cutting edge of the following transverse knife on which its rear edge is resting. The defects described may then be overcome to some extent by bevelling or curving the transverse knives and/or setting them at an angle or otherwise arranging or operating the machine so that the direction or nature of the "toe" cut neutralises the effect of this angular movement.

According to a further feature of the present invention there is provided a machine (e. g. a machine of the character above described) for cutting soles or the like from a bend or sheet of leather or other material, comprising a multiple pattern (preferably a jig-saw interfitting multiple pattern) in knives of the soles or other shapes to be cut, and a roller, the bend or sheet of leather being placed on the pattern of knives and then traversed by the roller so as to be impressed onto the knives whereby the soles or the like are cut out, wherein there are auxiliary knives bordering the multiple knife pattern and designed to cut across portions of the bend or sheet of leather bordering the multiple pattern of cut soles or the like. I have found that severing of these border portions, one portion from another, of the bend relieves a certain amount of stress and/or distortion of twisting in the bend and results in a more uniform cutting to size of the several soles or the like.

The present invention also provides a method of cutting several soles or the like from a bend of leather which comprises applying a multiple pattern (preferably a jig-saw interfitting multiple pattern) in knives of the soles or other shapes to the bend or sheet of leather so as to cut the soles or shapes therefrom and simultaneously cutting across the borders of the bend outside the pattern of cut soles or the like.

In a preferred embodiment of the invention the machine is, as before, in the form of a planing machine and comprises a table which carries the multiple jig-saw interfitting pattern of knives and a roller located above the table so as to impress a bend of leather onto the knives as the table is traversed under the roller. In using the machine a bend of leather is placed over the pattern of knives and this bend has, of necessity, to overlap the pattern on all four sides thereof. The result is that as the bend is traversed through the machine the soles are cut out of the bend leaving a roughly rectangular border or frame of some inches wide which surrounds the pattern. This border is subsequently cut into heels or other parts which are smaller in size than the soles and can, therefore, conveniently be cut from the border leather. Heretofore, this border of leather has caused or maintained a stress or distortion in the bend, as the table moves under the roller, so that the cut soles vary in size as between one another even though the individual knife patterns are all of substantially identical size. To avoid this, the knife pattern is provided with auxiliary knives which branch from the main pattern and lie under the border leather at both sides of the bend, the knives extending at right angles to, or being inclined, in the direction of cutting so that as the bend travels through the machine the border leather is cut across, say, two, three or more times. Similarly or alternatively, knives may be located under the border leather at one or both ends of the bend, these knives extending straight or being inclined in the direction of movement of the bend. The cut-off border pieces can still be used for cutting into heels or other small pieces but the advantage of the arrangement is that the stress or distortion of the leather is relieved and the soles obtained are all of substantially the same size even though they may be slightly shorter than the actual individual knife-patterns. The fact that they are uniform as between one another enables the size of the individual knife-patterns to be selected to compensate for any shortening of the soles from the desired length.

The cutting-off of the border leather also facilitates removal of the cut-soles from the knife pattern.

Marks or a scale may be provided along the side or sides and/or ends of the knife-pattern and well outside the outer borders thereof. These marks or the scale enable the bend easily to be located correctly and economically on the knife-pattern which is, of course, obscured by the bend.

I have found it advantageous in some cases to feed the bend of leather through the machine "shoulder end" foremost instead of "britch end" foremost, but the bend is preferably placed on the knives so that any spare (i. e. uncut) portion of the bend will be at the shoulder end.

I have also found it advantageous if the bend or sheet of leather is placed on the pattern of knives with the grain side of the bend against the knife edges, i. e. the flesh or rough side is the side engaged by the roller. If the knives have means for nicking or otherwise marking the rows of soles differentially, as described in specification No. 579,343 so as to indicate from which part of, say, a bend (e. g. belly or backbone) a particular sole has been cut, then I may feed the bend from one side of the animal britch-first and bends from the other side of the animal shoulder-first. If it is desired to feed all bends either britch-end or shoulder-end foremost, whichever may be desirable, then bends from one side of the animal may be fed forward from one end of the machine and bends from the other side of the animal fed forward from the opposite end of the machine. Both the arrangements just described enable me to operate with the grain side of all bends against the knife edge, whilst still retaining correct marking by the nicking device provided on the knives, as above described, and without the necessity of providing two separate sets of knives, one for a bend from one side of the animal and one for a bend from the opposite side.

The invention will be further described, by way of example, with reference to the accompanying drawings which show one embodiment of the invention together with some modifications and variations thereof. On the drawings:

Figure 1 is a diagrammatic side elevation of the sole cutting machine.

Figure 2:
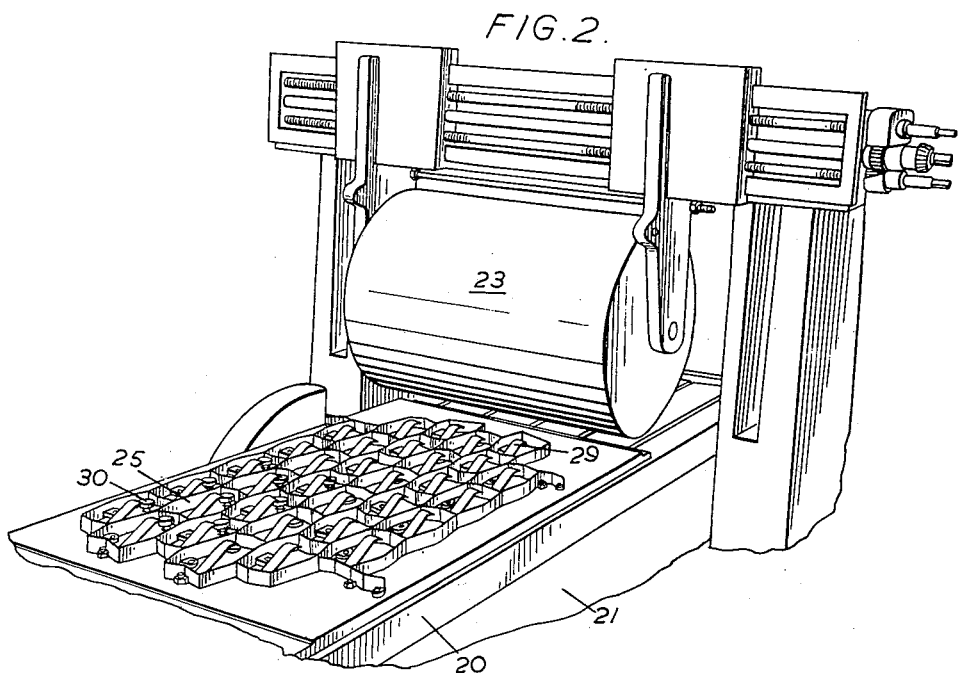
Figure 3:
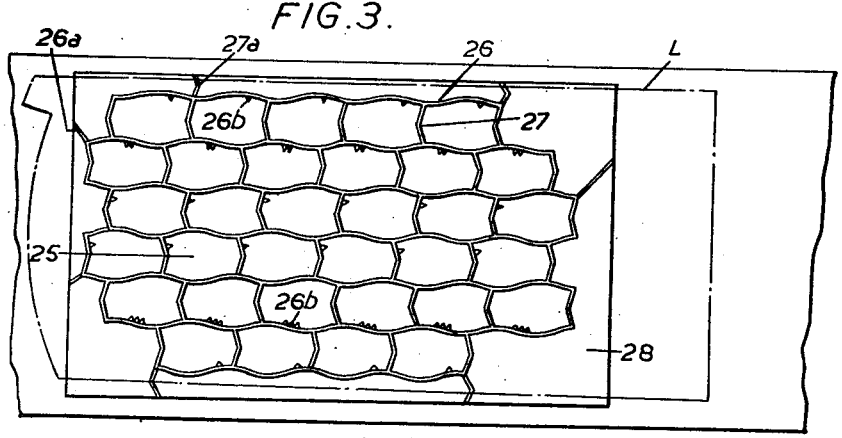
Figure 4:
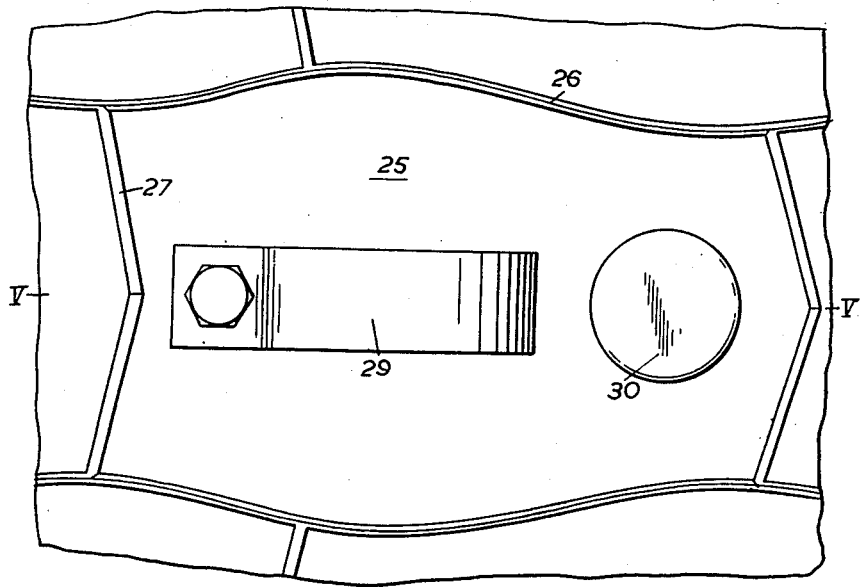
Figure 5:
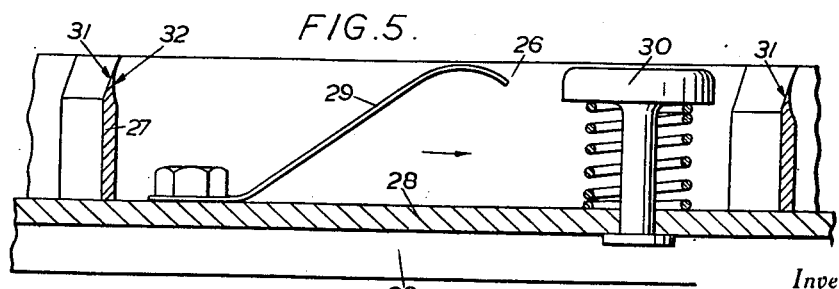

Figure 2 is a fragmentary perspective view of a part of the sole cutting machine shown in Figure 1, and illustrates in greater detail the knife pattern and roller by which the sole cutting operation is effected, Figure 3 is a plan view of the movable table and pattern of knives of the cutting machine, Figure 4 is a fragmentary plan view of the knife pattern and shows in detail one means adopted for ejecting the cut soles, Figure 5 is a sectional view on the line V—V of Figure 4, Figure 6 is a sectional view similar to Figure 5 showing an alternative means for ejecting the cut soles from the knife pattern, the section being taken on the line VI—VI of Figure 7, Figure 7 is a plan view of the sole ejecting means shown in Figure 6, Figure 8 is a cross-section on the line VIII—VIII of Figure 7, Figure 9 is a fragmentary detail view showing an arrangement for automatically raising the pressing roller of the machine on the return stroke of the movable table, and Figure 10 is a fragmentary front elevation of the arrangement shown in Figure 9.

Briefly, the machine shown in Figures 1 and 2 is similar in construction to the well known planing machine used in the metal working industry. This machine comprises the usual table or platen 20 which is reciprocated backwards and forwards on the bed plate 21, in the usual manner of planing machines, beneath a tool carrier 22. For the purpose of the present invention the carrier 22 rotatably supports a freely running heavy roller 23 supported in bearings 24 which permit a certain amount of vertical movement of the roller. The movable table 20 carries a jig-saw pattern of knives 25 (see Figures 2 and 3) comprising interfitting sole shapes. The jig-saw pattern of soles is made up of sinuous longitudinal knives 26 (see Figure 3) which may extend continuously for the whole length of the pattern, and transverse knives 27 located between the longitudinal knives. It is convenient to cut the knives out of solid metal and bolt or otherwise secure them to a base plate 28 which in turn is secured to the movable table 20 of the machine.

In using the machine a bend of leather indicated by the chain lines L in Figure 3 is placed on the pattern of knives and the table 20 is then traversed in the usual way under the roller 23. The roller bears hard down on the leather so that the latter is impressed on to the knives and is cut into a collection of cut soles in accordance with the knife pattern. These soles are ejected from the knife pattern by, for example, spring blades 29 and spring plungers 30 as shown in detail in Figures 4 and 5. After ejection the cut soles are collected from the knife pattern and the table is then traversed back under the roller, which may be temporarily raised during this return movement, ready for the cutting of a further bend of leather into soles.

The knives are formed with lateral projections 26b for effecting differential notching of the soles so as to facilitate sorting as described in specification No. 579,343.

In order to obtain soles which are cut as accurately as possible to the required size, the transverse knives 27 are bevelled or are of wood-chisel-like form on their rear faces as indicated at 31 in Figures 5 and 6 and the foremost faces of said transverse knives at and adjacent their cutting edges are of concave or hollow ground form as indicated at 32 in Figures 5 and 6.

The direction of movement during the cutting operation is indicated by the arrows in Figures 5 and 6. It will be understood that the force provided by the roller to press the sheet or bend of leather onto the knives may have a substantial component acting in the plane of the sheet or bend and tending to slide it relatively to the knives. The particular formation and arrangement of the transverse knives just described reduces this component to a very material extent. The term "rear" where used above in relation to the knives is intended to mean the rear with respect to the direction of movement of the cutting table 20 during the cutting operation.

It is also of advantage from the point of view of obtaining soles which are accurate in size to provide auxiliary knives 26a and/or 27a outside the margins of the knife pattern so as to sever the bordering leather, i. e. the leather of the bend which comes outside the knife pattern. It is found that cutting of this bordering leather releases strain and distortion in the bend and results in a more accurate cutting of the soles.

The ejecting means for the soles shown in Figures 6, 7 and 8 as an alternative to the spring devices 29, 30 shown in Figures 4 and 5, comprises within each sole pattern a bearing block 33 secured on the knife base an in which is journalled a shaft 34. A lever 35 is mounted on each end of the shaft 34 in such a way that the two levers can rotate or rock fairly freely. The rearmost arms 36 of the two levers are set at an obtuse angle, e. g. an angle of about 120°, with respect to the foremost arms 37 and are longer than the latter. Both arms 36 and 37 terminate at the level, or slightly above the level, of the cutting edges of the knives. The distance between the ends of the arms 36 and 37 is such that as a result of the relative traversing movement between the roller and the knives the roller will have passed over the forward arm before contacting the rear arm.

The device operates in the following way. As the platen carrying the knives is moved forward the roller impresses the bend of leather or other sheet material against the forward part of the knife pattern and depresses the forward arms 37 causing the rear arms 36 to rise and press against the under surface of the leather bend and thus tends to press or "wrap" the contact portion of leather towards or around the roller. As the platen moves further forward the forward arms 37 of the levers move away from the roller, which then impresses the leather against the rear part of the knives and also depresses the rear arms 36 of the levers. As a result the forward arms rise and force the front part of the severed shape upwards and above the level of the knife edges thus facilitating removal of the leather or other sheet material from the cutting member. With the ejecting arrangement just described it will probably be of advantage to make the pressing roller 23 much smaller in diameter than is shown in Figures 1 and 2. A diameter of about nine inches will probably be suitable.

Figures 9 and 10 show an arrangement for raising the roller 23 automatically on the return stroke of the table 20 carrying the knife pattern. By raising the roller on this return or idle stroke wear on the roller and knives is considerably reduced.

In the arrangement shown in Figures 9 and 10 the shaft 50 of the roller 23 is mounted eccentrically in bearing brackets 51. One end of the shaft 50 has an extension 52 on the end of which is secured a crank disc 53, the crank disc and extension 52 being, of course, eccentric with respect to the main roller supporting shaft 50. The crank pin 53' of the crank disc works in a slot 54 in a lever 55 pivoted to the bearing bracket 51 by a pin and slot arrangement 56. The bracket 51 is, of course, supported from the main frame of the machine. An extension piece 57 is secured on the lower end of the lever 55 and is adapted to be engaged by pivoted tappets 58 and 59 mounted on the side of the movable table 20 of the machine. The tappet 58 is free to rock in the anti-clockwise direction but its movement in the clockwise direction is limited by an abutment 60 whereas the tappet 59 is free to rock in the clockwise direction but its movement in the anti-clockwise direction is limited by an abutment 61. The arrangement just described operates as follows:

On the forward stroke of the table 20, i. e. the operating stroke, before the leather comes under the roller 23 the tappet 58 engages the part 57 of the lever 55 and rocks the lever and thereby imparts angular movement to the crank disc 53. This, in turn, rotates the shaft 50 and due to the eccentricity thereof with respect to the bearing 51, 52, the roller 23 is lowered so as to bear-down on the leather. As the forward motion of the table 20 continues the soles are cut out in the manner previously described. During this forward movement of the table the tappet 59 passes freely under the lever extension 57 due to the fact that it can tilt in the clockwise direction. On the return or idle stroke of the table 20 the tappet 59 at the commencement of this stroke engages the lever extension 57 and effects a reverse angular movement of the crank disc 53 so that the shaft 50 is moved back to the position shown in Figure 9 and the roller 23 is raised clear of the knives. During this return movement the tappet 58 passes freely under the extension 57 of the lever 55 because the tappet is free to rock in the anti-clockwise direction.

As a further arrangement to compensate for the tendency to "short-cutting" or "long-cutting" of the soles, the knife patterns, or some of them, may be made "over-size" or "undersize" particularly as regards their length so that the actual soles cut will at least approximate to the correct size.

Preferably the leather from which the soles are cut is dry as this tends towards more accurate dimensions. The term "dry" is not, however, intended to preclude some damping of the flesh-side of the leather so as so facilitate the usual subsequent grading operation in which the flesh-side of the sole is "planed" level.

I claim:

1. In a machine for cutting shapes from sheet material and particularly leather soles or the like from a bend of leather, the combination of a multiple pattern of knives of the same outlines as the shapes to be cut, a roller, means supporting said roller above the pattern of knives and in way thereof, and means for moving the pattern of knives against and under the roller with the bend or sheet of leather therebetween to impress it onto the knives whereby the soles or other shapes are cut out, the improvement in the transverse knives of said multiple pattern which comprises a single inclined or bevelled edge on said transverse knives and at the rear thereof in relationship to the direction of movement of the knives beneath the roller during the cutting stroke.

2. In a machine for cutting shapes from sheet material and particularly leather soles or the like from a bend of leather, the combination of a multiple pattern of knives of the same outlines as the shapes to be cut, a roller, means supporting said roller above the pattern of knives and in way thereof, and means for moving the pattern of knives against and under the roller with the bend or sheet of leather therebetween to impress it onto the knives whereby the soles or other shapes are cut out, the improvement in the transverse knives of said multiple pattern which comprises a cutting edge on said transverse knives which is bevelled on one side and hollow ground on the other, the bevelled side being at the rear and the hollow ground side at the front in relationship to the direction of movement of the pattern of knives beneath the roller during the cutting stroke.

3. In a machine for cutting shapes from sheet material and particularly leather soles or the like from a bend of leather, the combination of a multiple pattern of knives of the same outlines as the shapes to be cut, a roller, means supporting said roller above the pattern of knives and in way thereof, and means for moving the pattern of knives against and under the roller, with the bend or sheet of leather therebetween to impress it onto the knives whereby the soles or other shapes are cut out, the improvement in the multiple pattern of knives which comprises at least two spaced-apart auxiliary knives projecting laterally, in respect to the direction of movement of the pattern of knives, from each side of the knife pattern proper for cutting right across portions of the bend bordering the multiple pattern proper of the soles being cut as the bend moves under the roller, and sever entirely during such movement of the pattern of knives the cut part of the bend from the uncut part thereof.

4. In a machine for cutting shapes from sheet material and particularly leather soles or the like from a bend of leather, the combination of a multiple pattern of knives of the same outlines as the shapes to be cut, a roller, means supporting said roller above and in way of the pattern of knives, and means for moving the pattern of knives against and under the roller with the bend or sheet of leather therebetween to impress it onto the knives whereby the soles or other shapes are cut out, the improvement within each element of the multiple pattern of knives which comprises a lever having a horizontal pivot and its arms extending along the line of movement of the pattern of knives with their extremities at least as high as the cutting edges of the knives so that during the cutting operation the rearmost arm is depressed by operation of the roller through the bend of leather and the foremost arm is thereby raised to eject a cut shape from the knives.

5. In a machine for cutting shapes from sheet material and particularly leather soles or the like from a bend of leather, the combination of a multiple pattern of knives of the same outlines as the shapes to be cut, a roller, means supporting said roller above the pattern of knives and in way thereof, and means for moving the pattern of knives against and under the roller with the bend or sheet of leather therebetween to impress it onto the knives whereby the soles or other shapes are cut out, the improvement in the transverse knives of said multiple pattern which comprises a single inclined or bevelled edge on said transverse knives and which is at the rear in relationship to the direction of movement of the knives beneath the roller during the cutting stroke, and each element of the multiple pattern of knives comprising a lever having a horizontal pivot and its arms extending along the line of movement of the pattern of knives with their extremities at least as high as the cutting edges of the knives so that during the cutting operation the rearmost arm is depressed by operation of the roller through the bend of leather and the foremost arm is thereby raised to eject a cut shape from the knives.

References Cited in the file of this patent

UNITED STATES PATENTS

| Number | Name | Date |
|---|---|---|
| 24,141 | Shattuck | May 24, 1859 |
| 558,864 | Van Osta | Apr. 21, 1896 |
| 674,963 | Dewes | May 28, 1901 |
| 1,177,005 | Zimmerman | Mar. 28, 1916 |
| 1,811,571 | Ackerman | June 23, 1931 |
| 2,168,401 | Evers | Aug. 8, 1939 |
| 2,424,678 | Collinson | Jan. 27, 1947 |